US012104933B2

(12) United States Patent
Sakamoto et al.

(10) Patent No.: US 12,104,933 B2
(45) Date of Patent: Oct. 1, 2024

(54) OPTICAL SENSOR AND PHYSICAL QUANTITY MEASUREMENT DEVICE

(71) Applicant: NAGANO KEIKI CO., LTD., Tokyo (JP)

(72) Inventors: Ayumu Sakamoto, Tokyo (JP); Keiichi Fujita, Tokyo (JP); Tsutomu Yamate, Tokyo (JP); Ken Ogawa, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 54 days.

(21) Appl. No.: 17/620,983

(22) PCT Filed: Jun. 24, 2020

(86) PCT No.: PCT/JP2020/024836
§ 371 (c)(1),
(2) Date: Dec. 20, 2021

(87) PCT Pub. No.: WO2020/262460
PCT Pub. Date: Dec. 30, 2020

(65) Prior Publication Data
US 2022/0357185 A1 Nov. 10, 2022

(30) Foreign Application Priority Data
Jun. 25, 2019 (JP) ................. 2019-116954

(51) Int. Cl.
*G01D 5/26* (2006.01)
*G01K 11/125* (2021.01)
*G01L 11/02* (2006.01)

(52) U.S. Cl.
CPC ............ *G01D 5/264* (2013.01); *G01D 5/266* (2013.01); *G01D 5/268* (2013.01); *G01K 11/125* (2013.01); *G01L 11/02* (2013.01)

(58) Field of Classification Search
CPC ........ G01D 5/264; G01D 5/266; G01D 5/268; G01K 11/125; G01K 11/32; G01L 11/02; G01L 9/0079; G01L 19/04; G01L 5/24
See application file for complete search history.

(56) References Cited

U.S. PATENT DOCUMENTS

| 4,752,141 A * | 6/1988 | Sun ........................ G01D 5/268 374/161 |
| 4,933,545 A * | 6/1990 | Saaski ..................... G01L 11/02 250/231.19 |

(Continued)

FOREIGN PATENT DOCUMENTS

| JP | S58-103633 | 6/1983 |
| JP | 2007-532871 | 11/2007 |
| WO | 2005/098385 A1 | 10/2005 |

OTHER PUBLICATIONS

Extended European Search Report dated Dec. 16, 2022 issued in corresponding European application No. 20831696.8; English text (8 pages).

(Continued)

*Primary Examiner* — Mohamed K Amara
(74) *Attorney, Agent, or Firm* — Rankin, Hill & Clark LLP

(57) ABSTRACT

An optical sensor includes a tube-shaped base formed from a metal, an optical fiber member received inside the base, and a sensor head formed from monocrystalline alumina and bonded to the base to be optically connected with the optical fiber member. The sensor head is provided with a first cavity including a first reflection surface configured to reflect a part of light introduced through the optical fiber member and a second reflection surface provided facing the first reflection surface and configured to reflect a part of the light reflected by the first reflection surface. A first interference light produced by an interference between the light reflected by (Continued)

the first reflection surface and the light reflected by the second reflection surface is output from the first cavity.

9 Claims, 9 Drawing Sheets

(56) References Cited

U.S. PATENT DOCUMENTS

| | | | | |
|---|---|---|---|---|
| 5,058,983 | A * | 10/1991 | Corke | G02B 6/3874 385/78 |
| 5,129,897 | A * | 7/1992 | Daikuzono | A61B 18/22 606/16 |
| 5,182,779 | A * | 1/1993 | D'Agostino | G01D 5/35316 385/13 |
| 5,297,480 | A * | 3/1994 | Miyashita | B30B 15/061 156/583.1 |
| 5,315,110 | A * | 5/1994 | Smith | G01L 9/0079 250/227.27 |
| 5,381,229 | A * | 1/1995 | Murphy | G01K 11/3206 374/161 |
| 5,559,358 | A * | 9/1996 | Burns | G01L 9/002 257/415 |
| 5,619,046 | A * | 4/1997 | Engstrom | G01L 9/0079 356/519 |
| 5,657,405 | A * | 8/1997 | Fujiwara | G02B 6/241 356/225 |
| 5,870,511 | A * | 2/1999 | Sawatari | G01K 11/3206 385/12 |
| 6,141,098 | A * | 10/2000 | Sawatari | G01K 11/3206 356/519 |
| 6,233,374 | B1 * | 5/2001 | Ogle | G02B 6/29398 385/12 |
| 6,430,324 | B1 * | 8/2002 | Muramatsu | G02B 6/241 385/12 |
| 6,492,957 | B2 * | 12/2002 | Carillo, Jr. | H01Q 1/273 250/336.1 |
| 8,253,945 | B2 * | 8/2012 | Gahan | G01L 9/0079 356/480 |
| 8,559,770 | B2 * | 10/2013 | Donlagic | G01L 9/0079 385/12 |
| 9,074,957 | B2 * | 7/2015 | Jiang | G01L 11/025 |
| 9,116,176 | B2 * | 8/2015 | Zhang | G01R 19/00 |
| 9,240,262 | B1 * | 1/2016 | Challener | G01M 11/31 |
| 9,250,140 | B2 * | 2/2016 | Challener | B81B 7/02 |
| 9,482,596 | B2 * | 11/2016 | Karp | G01M 15/14 |
| 9,500,808 | B2 * | 11/2016 | Carralero | G02B 6/241 |
| 9,512,715 | B2 * | 12/2016 | Challener | G01L 19/0092 |
| 9,766,178 | B2 * | 9/2017 | Pechstedt | G01F 23/292 |
| 9,989,385 | B2 * | 6/2018 | Harpin | G02B 6/424 |
| 11,287,575 | B2 * | 3/2022 | Williams | G02B 6/29358 |
| 11,320,596 | B2 * | 5/2022 | Williams | G02B 6/29359 |
| 11,519,779 | B1 * | 12/2022 | Bivolaru | G01H 9/004 |
| 2002/0003917 | A1 * | 1/2002 | Sherrer | G01L 23/16 73/705 |
| 2002/0009252 | A1 * | 1/2002 | Maron | G01L 9/0077 385/12 |
| 2003/0100824 | A1 * | 5/2003 | Warren | B05C 5/0225 600/407 |
| 2004/0120844 | A1 * | 6/2004 | Tribelsky | A61L 2/10 422/38 |
| 2005/0062979 | A1 * | 3/2005 | Zhu | G01L 9/0079 356/480 |
| 2005/0195402 | A1 * | 9/2005 | May | G01L 9/0079 356/480 |
| 2007/0006663 | A1 * | 1/2007 | Zerwekh | G01L 9/0077 374/E11.016 |
| 2007/0089524 | A1 * | 4/2007 | Walchli | G01L 9/0079 73/718 |
| 2007/0223000 | A1 * | 9/2007 | Gahan | G01L 9/0079 356/519 |
| 2008/0192803 | A1 * | 8/2008 | Riza | G01K 11/125 374/161 |
| 2009/0118715 | A1 * | 5/2009 | Mansour | A61F 9/008 606/4 |
| 2009/0151423 | A1 | 6/2009 | Wu et al. | |
| 2009/0296776 | A1 * | 12/2009 | Riza | G01J 5/0014 374/130 |
| 2009/0320605 | A1 * | 12/2009 | Antila | C04B 37/005 356/519 |
| 2011/0244588 | A1 * | 10/2011 | Maity | G01N 21/45 436/164 |
| 2014/0208858 | A1 * | 7/2014 | Jiang | G01L 11/025 73/705 |
| 2014/0318273 | A1 | 10/2014 | Dong et al. | |
| 2015/0020599 | A1 | 1/2015 | Pechstedt et al. | |
| 2015/0177132 | A1 | 6/2015 | Pechstedt | |
| 2016/0202135 | A1 * | 7/2016 | Sanzari | G01L 9/0079 73/705 |
| 2017/0095667 | A1 * | 4/2017 | Yakovlev | A61B 5/0022 |
| 2019/0391356 | A1 * | 12/2019 | Bae | H01J 37/32 |
| 2022/0163405 | A1 * | 5/2022 | James | G01K 11/3213 |

OTHER PUBLICATIONS

International Preliminary Report on Patentability, Date of mailing: Sep. 24, 2020, 4 pages.
International Search Report dated Sep. 9, 2020, 2 pages.

* cited by examiner

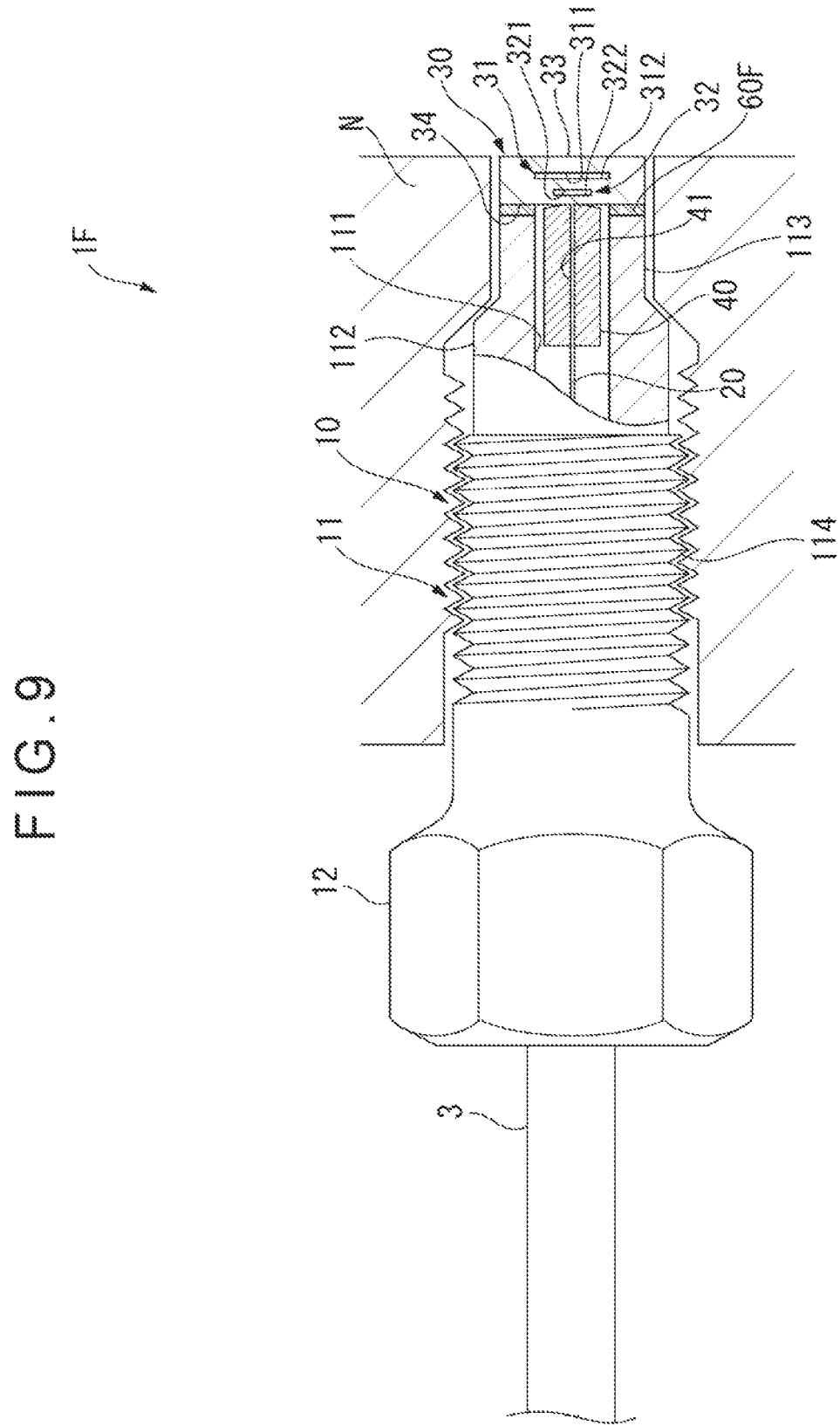

OPTICAL SENSOR AND PHYSICAL QUANTITY MEASUREMENT DEVICE

TECHNICAL FIELD

The present invention relates to an optical sensor and a physical quantity measuring device.

BACKGROUND ART

An optical sensor disclosed in Patent Literature 1 includes a sensor head provided with a cavity having first and second reflection surfaces. Light introduced through an optical fiber is reflected on the first and second reflection surfaces to produce reflected lights, which interfere each other to produce an interference light. The optical sensor is configured to analyze the interference light to measure the physical quantity (e.g. pressure and temperature). In the optical sensor disclosed in Patent Literature 1, the sensor head and a base for supporting the sensor head are formed from sapphire with excellent physical/chemical strength, thereby allowing measurement of a high-temperature and/or high-pressure target fluid.

CITATION LIST

Patent Literature(s)

Patent Literature 1 US 2009/0151423 A

SUMMARY OF THE INVENTION

Problems to be Solved by the Invention

However, the sensor head and the base formed from sapphire in Patent Literature 1 are not easily produced by machining as compared with a sensor head and a base formed from, for instance, metal.

An object of the invention is to provide an optical sensor and a physical quantity measuring device having enhanced physical/chemical strength and being easily produced by machining.

Means for Solving the Problems

An optical sensor according to an aspect of the invention includes: a tube-shaped base formed from a metal; an optical waveguide received inside the base; and a sensor head bonded to the base to be optically connected with the optical waveguide, the sensor head being formed from monocrystalline alumina, in which the sensor head includes a first cavity including: a first reflection surface configured to reflect a part of light introduced through the optical waveguide; and a second reflection surface provided facing the first reflection surface and configured to reflect a part of the light introduced through the optical waveguide, the first cavity being a cavity from which a first interference light produced by an interference between the light reflected by the first reflection surface and the light reflected by the second reflection surface is output to the optical waveguide.

According to the above aspect of the invention, the sensor head brought into contact with the target fluid is provided with the first cavity from which the first interference light produced by the light reflected by the first reflection surface and the light reflected by the second reflection surface is output to the optical waveguide. Accordingly, for instance, the physical quantity (e.g. pressure and temperature) of the target fluid can be detected by analyzing the first interference light.

Further, the sensor head is formed from monocrystalline alumina (e.g. sapphire) with excellent physical/chemical strength. The sensor head is thus inhibited from being damaged even when the target fluid has high temperature and/or high pressure. Further, since the base bonded with the sensor head is formed from the metal, the base can be more easily produced by machining at lower production costs than a base formed from sapphire or the like. The physical/chemical strength and processability of the optical sensor can thus be enhanced.

In the optical sensor according to the above aspect of the invention, the base may be formed from a metal whose linear expansion coefficient is close to a linear expansion coefficient of the monocrystalline alumina.

According to the above arrangement, the base is formed from the metal whose linear expansion coefficient (e.g. 5.0 to $9.0 \times 10^{-6}$/degrees C.) is close to the linear expansion coefficient of the monocrystalline alumina (e.g. sapphire, linear expansion coefficient: 7.0 to $8.0 \times 10^{-6}$/degrees C.)). Specific examples of the metal include titanium (linear expansion coefficient: $8.4 \times 10^{-6}$/degrees C.), nickel alloy (linear expansion coefficient: 5.0 to $7.0 \times 10^{-6}$/degrees C.), and titanium alloy (linear expansion coefficient: 8.0 to $9.0 \times 10^{-6}$/degrees C.). Thus, even when the sensor head and the base are thermally expanded after being exposed to a high temperature, since the linear expansion coefficients of the sensor head and the base are close, thermal stress, which is generated at a bonding surface between the sensor head and the base due to the thermal expansion, can be reduced. The damage on the bonding surface due to the thermal expansion can thus be restrained.

In the optical sensor according to the above aspect of the invention, a distance between the first reflection surface and the second reflection surface may depend on a pressure of a target fluid.

According to the above arrangement, since the first interference light output from the first cavity depends mainly on the pressure of the target fluid, the pressure of the target fluid can be detected by analyzing the first interference light.

In the optical sensor according to the above aspect of the invention, the sensor head may include a second cavity including: a third reflection surface configured to reflect a part of the light introduced through the optical waveguide; and a fourth reflection surface provided facing the third reflection surface and configured to reflect a part of the light introduced through the optical waveguide, the second cavity being a cavity from which a second interference light produced by an interference between the light reflected by the third reflection surface and the light reflected by the fourth reflection surface is output to the optical waveguide, and a distance between the third reflection surface and the fourth reflection surface may depend on a temperature of the target fluid.

According to the above arrangement, the sensor head is provided with the second cavity from which the interference light produced by the light reflected by the third reflection surface and the light reflected by the fourth reflection surface is output to the optical fiber. Further, the distance between the third reflection surface and the fourth reflection surface depends mainly on the temperature of the target fluid. In other words, the second cavity is a temperature-measurement cavity.

The second interference light output from the second cavity thus depends on the temperature of the target fluid.

Accordingly, the pressure obtained based on the first interference light can be temperature-compensated by analyzing the second interference light, thereby improving the measurement accuracy of the pressure.

In the optical sensor according to the above aspect of the invention, the sensor head may include a contact surface located at an end of the sensor head to come into contact with the target fluid, and the first cavity may be located closer to the contact surface than the second cavity in the sensor head.

According to the above arrangement, the first cavity is provided closer to the contact surface than the second cavity in the sensor head. In other words, the first cavity is located closer to a part of the sensor head that is brought into contact with the target fluid. This increases the variation in the distance between the first reflection surface and the second reflection surface caused by the pressure of the target fluid, thereby enhancing the pressure detection accuracy based on the interference light from the first cavity.

It is preferable that the optical sensor according to the above aspect of the invention includes a dielectric film interposed between the optical waveguide and the sensor head to be optically connected with the optical waveguide, in which the dielectric film includes: a fifth reflection surface configured to reflect a part of the light introduced through the optical waveguide; and a sixth reflection surface provided facing the fifth reflection surface and configured to reflect a part of the light introduced through the optical waveguide, the dielectric film being a film from which a third interference light produced by an interference between the light reflected by the fifth reflection surface and the light reflected by the sixth reflection surface is output to the optical waveguide, and a distance between the fifth reflection surface and the sixth reflection surface depends on a temperature of the target fluid.

According to the above arrangement, the dielectric film, which includes the fifth reflection surface configured to reflect a part of the light introduced through the optical waveguide and the sixth reflection surface provided facing the fifth reflection surface and configured to reflect a part of the light introduced through the optical waveguide, is provided. Further, the distance between the fifth reflection surface and the sixth reflection surface depends mainly on the temperature of the target fluid.

The third interference light output from the dielectric film thus depends on the temperature of the target fluid. The pressure obtained based on the first interference light can thus be temperature-compensated by analyzing the third interference light, thereby improving the measurement accuracy of the pressure.

Further, since the temperature compensation can be applied to the sensor head provided with no temperature-measurement cavity, the sensor head can be more easily produced by machining.

In the optical sensor according to the above aspect of the invention, it is preferable that the sensor head includes an end surface parallel to the first reflection surface and the second reflection surface and configured to reflect a part of the light introduced through the optical waveguide, the sensor head being configured to output a fourth interference light to the optical waveguide, the fourth interference light being produced by an interference between the light reflected by the first reflection surface or the second reflection surface and the light reflected by the end surface, and a distance between the first reflection surface or the second reflection surface and the end surface depends on a temperature of the target fluid.

According to the above arrangement, the sensor head, which includes the end surface parallel to the first and second reflection surfaces and configured to reflect a part of the light introduced through the optical waveguide, is configured to output the fourth interference light to the optical waveguide, the fourth interference light being produced by an interference between the light reflected by the first reflection surface or the second reflection surface and the light reflected by the end surface. Further, the distance between the first reflection surface or the second reflection surface and the end surface depends on the temperature of the target fluid.

The fourth interference light output from the dielectric film thus depends on the temperature of the target fluid. Accordingly, the pressure obtained based on the first interference light can be temperature-compensated by analyzing the fourth interference light, thereby improving the measurement accuracy of the pressure.

Further, since the temperature compensation can be applied to the sensor head provided with no temperature-measurement cavity, the sensor head can be more easily produced by machining.

In the optical sensor according to the above aspect of the invention, the base and the sensor head may be directly bonded.

According to the above arrangement, no component for bonding the base and the sensor head is present between the base and the sensor head, and thus there is no risk of damaging such a component by high temperature and/or pressure. The physical/chemical strength of the optical sensor can be thus enhanced.

In the optical sensor according to the above aspect of the invention, the base and the sensor head may be bonded via a bonding member.

According to the above arrangement, the bonding member for bonding the base and the sensor head is interposed between the base and the sensor head. Due to the difference between the linear expansion coefficient of the base and the linear expansion coefficient of the sensor head, a thermal stress, which is possibly applied to a bonding portion between the base and the sensor head, can be released by the bonding member. The damage on the bonding portion between the base and the sensor head caused by the thermal stress can thus be restrained.

A physical quantity measuring device according to another aspect of the invention includes: a light source; an optical sensor including a tube-shaped base formed from a metal, an optical waveguide optically connected with the light source and received inside the base, and a sensor head bonded to an end of the base to be optically connected with the optical waveguide, the sensor head being formed from monocrystalline alumina; a light detector; and an arithmetic unit, in which the sensor head includes a first cavity including: a first reflection surface configured to reflect a part of light introduced through the optical waveguide; and a second reflection surface provided facing the first reflection surface and configured to reflect a part of the light introduced through the optical waveguide, the first cavity being a cavity from which a first interference light produced by an interference between the light reflected by the first reflection surface and the light reflected by the second reflection surface is output, the light detector is configured to detect a first interference signal based on the first interference light output from the first cavity, and the arithmetic unit is configured to calculate a physical quantity of a target fluid based on the first interference signal detected by the light detector.

According to the another aspect of the invention, the effects similar to those of the above-described aspect of the invention can be achieved.

BRIEF EXPLANATION OF DRAWINGS

FIG. 9 is a partially-cutaway cross sectional view of an optical sensor according to another modification.

DESCRIPTION OF EMBODIMENT(S)

First Exemplary Embodiment

A first exemplary embodiment of the invention will be described below with reference to the attached drawings.

Figure 1:
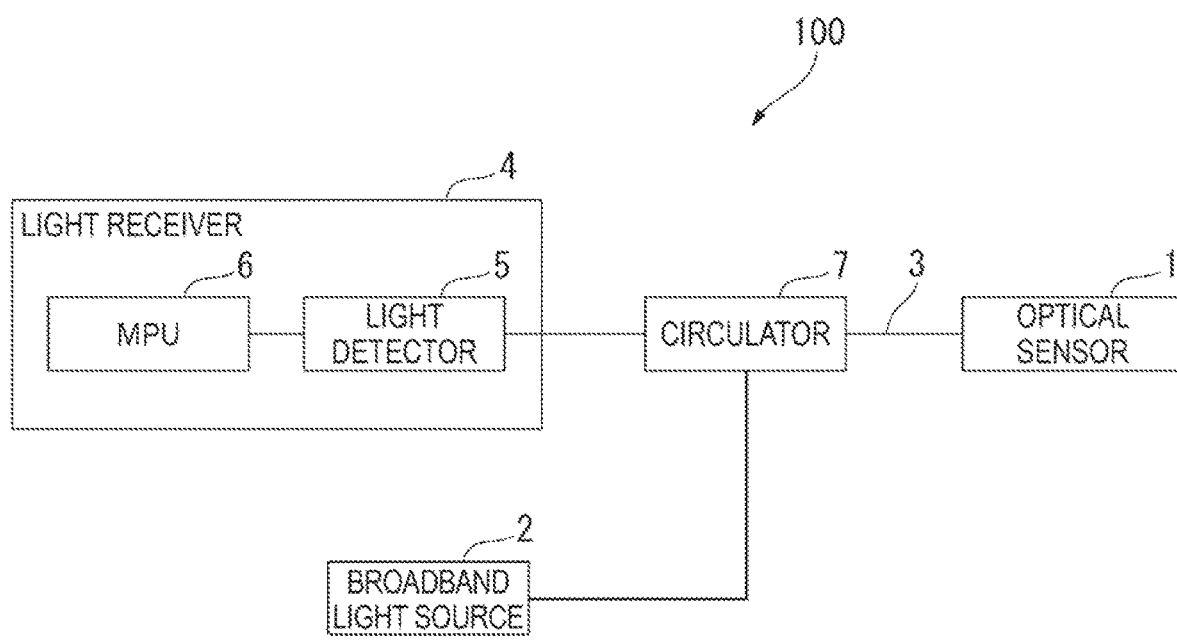
FIG. 1 schematically shows a structure of a physical quantity measuring device according to a first exemplary embodiment of the invention.

FIG. 1 schematically shows a structure of a physical quantity measuring device 100 according to the first exemplary embodiment.

As shown in FIG. 1, the physical quantity measuring device 100 includes an optical sensor 1, a broadband light source 2, an optical cable 3, a light receiver 4, and a circulator 7.

The optical sensor 1 is a sensor configured to detect a pressure of a target fluid. Details of the optical sensor 1 will be described later.

Broadband Light Source 2

The broadband light source 2 is configured to emit a broadband wavelength light. It should be noted that the broadband light source 2 is an exemplary light source of the invention.

The broadband light source 2 of the present exemplary embodiment is, for instance, a Super Continuum (SC) light source, which is configured to emit light of a wavelength region ranging approximately from 1200 nm to 1600 nm. It should be noted that the broadband light source 2 is not necessarily configured as described above but optionally is a combination of an Amplified Spontaneous Emission (ASE) light source, a Super Luminescent Diode (SLD) light source, an Light Emitting Diode (LED) light source, and the like or alternatively is a narrowband light source capable of sweeping a broadband range (e.g. tunable laser). Further alternatively, the broadband light source 2 may be configured to emit light of a wavelength region broader or narrower than the exemplified wavelength region.

Optical Cable 3

The optical cable 3 includes a so-called multi-mode optical fiber, protector, and the like, and light emitted from the broadband light source 2 is incident on the optical cable 3. The light emitted by the broadband light source 2 is transmitted to the optical sensor 1 through the optical cable 3. A first interference light and a second interference light output from the optical sensor 1 are transmitted to the light receiver 4 through the optical cable 3. It should be noted that the optical cable 3 is not necessarily provided with the multi-mode optical fiber but is optionally provided with, for instance, a single-mode optical fiber.

Circulator 7

The light emitted from the broadband light source 2 is incident on the circulator 7, and the circulator 7 transmits the incident light to the optical sensor 1. Further, the interference light output from the optical sensor 1 is incident on the circulator 7, and the circulator 7 transmits the incident light to the light receiver 4.

It should be noted that the circulator 7 is not necessarily configured as described above but is optionally in a form of, for instance, a beam splitter.

Optical Sensor 1

Figure 2:
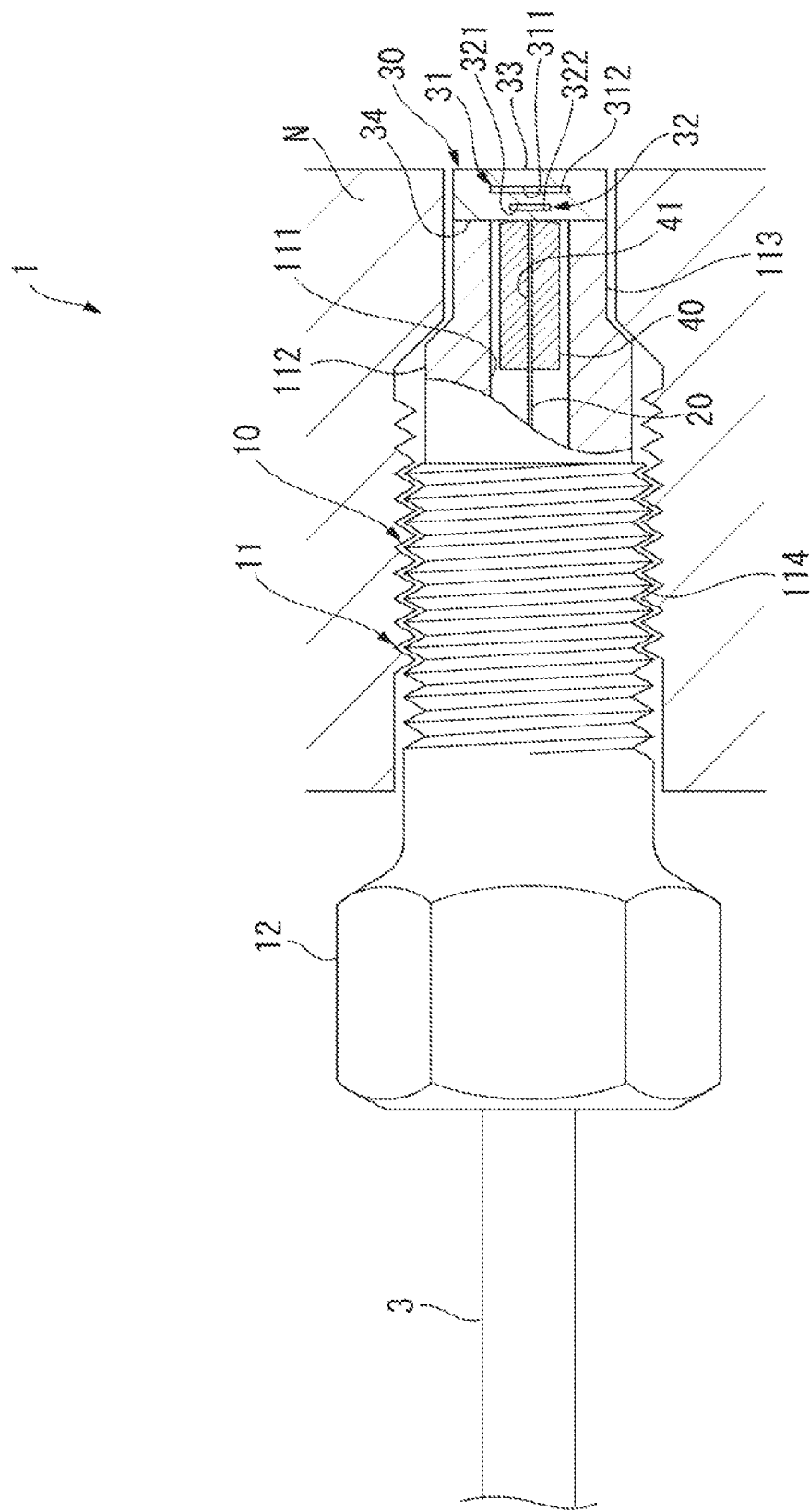
FIG. 2 is a partially-cutaway cross sectional view of an optical sensor according to the first exemplary embodiment.

FIG. 2 is a partially-cutaway cross sectional view of the optical sensor 1.

As shown in FIG. 2, the optical sensor 1 includes a base 10, an optical fiber member 20, a sensor head 30, and a ferrule 40.

Base 10

The base 10, which is formed from a metal, includes a base body 11 and a tool engagement portion 12.

The base 10 of the present exemplary embodiment is formed from titanium whose linear expansion coefficient is close to the linear expansion coefficient of sapphire. Specifically, the linear expansion coefficient of sapphire, which is 7.0 to $8.0 \times 10^{-6}$/degrees C., is very close to the linear expansion coefficient of titanium, which is $8.4 \times 10^{-6}$/degrees C.

The base body 11, which is formed into a cylindrical shape, is provided therein with a through hole 111. The base body 11 is also provided with a large-diameter portion 112 and a small-diameter portion 113. It should be noted that the base body 11 is not necessarily a cylindrical-shaped component but may be, for instance, a polygonal-shaped component.

The tool engagement portion 12 is provided at a first end of the large-diameter portion 112 and the small-diameter portion 113 is provided at a second end of the large-diameter portion 112. An external thread 114 configured to be screwed with an internal thread in a connection target N is provided on a circumference of the large-diameter portion 112.

The small-diameter portion 113 is shaped to have a diameter smaller than the diameter of the large-diameter portion 112. The sensor head 30 is bonded to an end of the small-diameter portion 113. In the present exemplary embodiment, the small-diameter portion 113 and the sensor head 30 are directly bonded. Examples of the direct bonding process include Atomic Diffusion Bonding (ADB), Surface-Activated Bonding (SAB), and thermal diffusion bonding.

It should be noted that the base body 11 is not necessarily configured as described above. For instance, the base body 11 may not be provided with the small-diameter portion 113. In this case, the base body 11 may be formed to have a constant diameter from a first end to a second end thereof.

Further, the base body 11 may not be provided with the external thread 114. In this case, the base body 11 may be attached to the connection target N by, for instance, welding.

The tool engagement portion 12, which radially extends from the center of the base 10, is engageable with a tool (e.g. a wrench).

Optical Fiber Member 20

The optical fiber member 20 is installed in the through hole 111 of the base body 11. In the present exemplary embodiment, the optical fiber member 20, which is provided by a so-called multi-mode optical fiber, is provided in a manner continuous with the optical fiber of the optical cable 3. Thus, the optical fiber member 20 is optically connected with the broadband light source 2. It should be noted that the optical fiber member 20 is not necessarily continuous with the optical fiber of the optical cable 3. For instance, the optical fiber member 20 may be connected with the optical fiber of the optical cable 3 through a connector or the like.

The light incident on the optical fiber member 20 through the optical cable 3 is transmitted to the sensor head 30 through the optical fiber member 20. Further, the interference light output from the sensor head 30 is transmitted to the optical cable 3 through the optical fiber member 20. It should be noted that the optical fiber member 20 is an exemplary optical waveguide of the invention.

It should also be noted that the optical fiber member 20 is not necessarily provided by the multi-mode optical fiber but is optionally provided by, for instance, a single-mode optical fiber.

Sensor Head 30

The sensor head 30 is a cylindrical component formed from monocrystalline alumina in a form of sapphire. In the present exemplary embodiment, the sensor head 30 includes a first cavity 31, a second cavity 32, a contact surface 33, and a bonding surface 34. The first cavity 31 and the second cavity 32 are internally vacuum cylindrical cavities concentrically arranged in a plan view seen from the contact surface 33.

The contact surface 33, which is provided at an end of the sensor head 30, is brought into contact with the target fluid.

The bonding surface 34, which is provided close to the base 10 on the sensor head 30, is configured to be bonded to the small-diameter portion 113.

Figure 3:
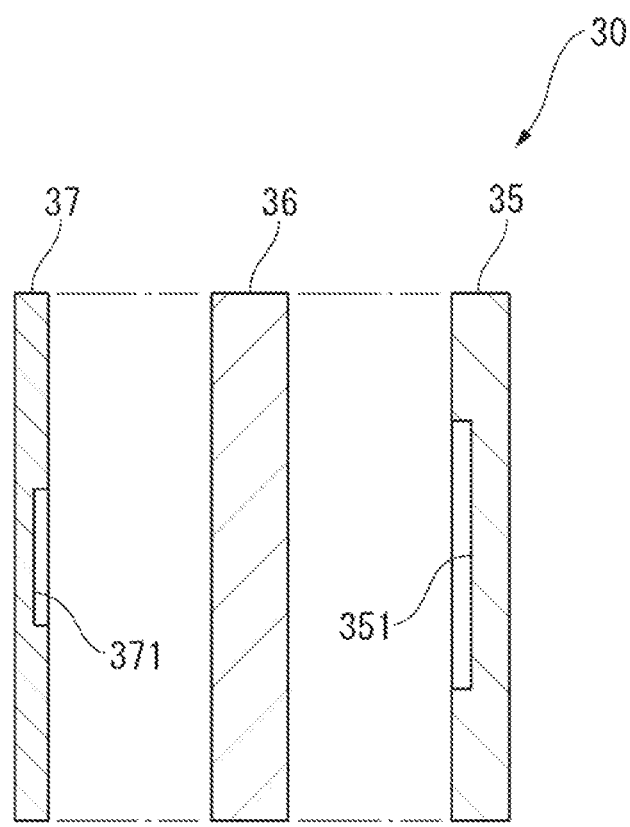
FIG. 3 is an exploded cross-sectional view of a sensor head according to the first exemplary embodiment.

FIG. 3 is an exploded cross-sectional view of the sensor head 30.

As shown in FIG. 3, the sensor head 30 includes a first sensor head portion 35, a second sensor head portion 36, and a third sensor head portion 37.

A cylindrical first recess 351 is formed in the first sensor head portion 35 using, for instance, Micro Electro Mechanical System (MEMS). Similarly, a cylindrical second recess 371 is formed in the third sensor head portion 37 by, for instance, MEMS. The first recess 351 and the second recess 371 are concentrically arranged.

The sensor head 30 is provided by fusion bonding of the first sensor head portion 35, the second sensor head portion 36, and the third sensor head portion 37 in a vacuum environment. Specifically, the first recess 351 defines the first cavity 31 and the second recess 371 defines the second cavity 32. The interiors of the first cavity 31 and the second cavity 32 are thus vacuum in the present exemplary embodiment.

It should be noted that the first recess 351 and the second recess 371 are not necessarily formed using MEMS, and may be formed through, for instance, a machining process (e.g. laser processing). Further, the first sensor head portion 35, the second sensor head portion 36, and the third sensor head portion 37 are not necessarily bonded by the fusion bonding, and may be bonded by, for instance, ADB or SAB. In addition, the interiors of the first cavity 31 and the second cavity 32 are not necessarily vacuum, and air or the like may be present therein. Further, the first cavity 31 and the second cavity 32 may be in communication with the through hole 111 through a communication hole or the like so that the gauge pressure is measurable.

Referring back to FIG. 2, the first cavity 31 is provided with a first reflection surface 311 and a second reflection surface 312. The first reflection surface 311 reflects a part of the light incident thereon through the optical fiber member 20. The second reflection surface 312, which faces the first reflection surface 311, reflects a part of the light incident thereon through the optical fiber member 20. The light reflected by the first reflection surface 311 and the light reflected by the second reflection surface 312 interfere with each other to produce the first interference light output from the first cavity 31. It should be noted that the first cavity 31 may be configured to multiply-reflect the light by the first reflection surface 311 and the second reflection surface 312 to cause interference between the multiply-reflected light beams.

In the first cavity 31, a distance between the first reflection surface 311 and the second reflection surface 312 depends on the pressure and temperature of the target fluid. In other words, the first interference light is output from the first cavity 31 depending on the pressure and temperature of the target fluid.

It should be noted that the first cavity 31 is positioned closer to the contact surface 33 than the second cavity 32. It should also be noted that the first cavity 31 has a larger diameter than the diameter of the second cavity 32. A member between the first cavity 31 and the contact surface 33 is thus more easily bent by the pressure of the target fluid. Accordingly, the distance between the first reflection surface 311 and the second reflection surface 312 in the first cavity 31 more easily varies depending on the pressure of the target fluid. In other words, the first interference light output from the first cavity 31 is affected mainly by the pressure of the target fluid. The first cavity 31 is thus a pressure-measurement cavity.

The second cavity 32 is provided with a third reflection surface 321 and a fourth reflection surface 322. The third reflection surface 321 reflects a part of the light incident thereon through the optical fiber member 20. Further, the fourth reflection surface 322 reflects a part of the light incident thereon through the optical fiber member 20. The light reflected by the third reflection surface 321 and the light reflected by the fourth reflection surface 322 interfere with each other to produce the second interference light output from the second cavity 32. It should be noted that the second cavity 32 may be configured to multiply-reflect the light by the third reflection surface 321 and the fourth reflection surface 322 to cause interference between the multiply-reflected light beams.

The second cavity 32 is positioned closer to the base 10 than the first cavity 31. It should be noted that the second cavity 32 has a diameter smaller than the diameter of the first cavity 31. A distance between the third reflection surface 321 and the fourth reflection surface 322 in the second cavity 32 is thus insusceptible to the pressure of the target fluid. In other words, the second interference light output from the second cavity 32 is not likely to be affected by the pressure of the target fluid. The distance between the third reflection surface 321 and the fourth reflection surface 322 in the second cavity 32 depends mainly on the temperature of the target fluid. In other words, the second cavity 32 is a temperature-measurement cavity.

Ferrule 40

The ferrule 40 is a component for supporting the optical fiber member 20.

In the present exemplary embodiment, the ferrule 40 has a hole 41 penetrating therethrough. The hole 41 extends from a first end to a second end of the ferrule 40. The optical fiber member 20 is inserted into the hole 41 of the ferrule 40. The ferrule 40 thus supports the optical fiber member 20.

It should be noted that the ferrule 40 of the present exemplary embodiment supports the optical fiber member 20 so that an end of the optical fiber member 20 is in contact with the bonding surface 34 of the sensor head 30.

Referring back to FIG. 1, the first interference light and the second interference light output from the optical sensor 1 are incident on the light receiver 4. The light receiver 4 calculates the physical quantity depending on the first interference light and the second interference light. The light receiver 4 includes a light detector 5 and an MPU 6.

The light detector 5, which includes a light-detecting element, photoelectric transducer, amplifier, AD converter, and the like (all not shown), is configured to detect the first interference light and second interference light incident thereon to output a first interference signal and a second interference signal.

The MPU 6 (i.e. a so-called Micro Processing Unit) is configured to receive the plurality of interference signals output from the light detector 5 to calculate the physical quantity depending on the respective interference signals. In the present exemplary embodiment, the MPU 6 is configured to measure the physical quantity based on the first interference signal and the second interference signal using typically known calculation method(s). Specifically, the MPU 6 obtains an interference pattern (interference fringe) based on each of the first interference signal and the second interference signal. The MPU 6 then calculates a phase variation based on a periodical change in the intensity of the interference pattern. The MPU 6 stores a correlation between the phase variation and the physical quantity in advance, and calculates the physical quantity corresponding to the phase variation. It should be noted that the MPU 6 is an exemplary arithmetic unit of the invention.

As described above, the first interference light of the present exemplary embodiment is affected by the pressure and the temperature of the target fluid. The first interference signal thus depends mainly on the pressure of the target fluid, and also depends on the temperature of the target fluid.

In contrast, the second interference light is affected by the temperature of the target fluid, but insusceptible to the pressure of the target fluid. The second interference signal thus depends mainly on the temperature of the target fluid.

Accordingly, the MPU 6 can calculate the pressure of the target fluid by subtracting the calculated physical quantity based on the second interference signal from the calculated physical quantity based on the first interference signal. In other words, since the pressure obtained based on the first interference light of the first cavity 31 can be temperature-compensated, the measurement accuracy for the pressure of the target fluid can be improved.

The following advantages can be achieved by the above-described first exemplary embodiment.

(1) In the first exemplary embodiment, the sensor head 30 brought into contact with the target fluid is provided with the first cavity 31 from which the first interference light produced by the light reflected by the first reflection surface 311 and the light reflected by the second reflection surface 312 is output. The physical quantity (e.g. pressure) of the target fluid can thus be detected by analyzing the first interference light.

Further, the sensor head 30 is formed from sapphire with excellent physical/chemical strength. The damage on the sensor head 30 can thus be inhibited even when the temperature and/or pressure of the target fluid is high. Further, since the base 10 bonded with the sensor head 30 is formed from metal (i.e. titanium), the base 10 can be more easily produced by machining at lower production costs than the base 10 formed from sapphire. The physical/chemical strength and processability of the optical sensor 1 can thus be enhanced.

(2) The base 10 of the first exemplary embodiment is formed from titanium whose linear expansion coefficient is close to the linear expansion coefficient of sapphire. Thus, even when the sensor head 30 and the base 10 are thermally expanded after being exposed to a high temperature, since the linear expansion coefficients of the sensor head 30 and the base 10 are close, thermal stress, which is generated at the bonding surface 34 between the sensor head 30 and the base 10 due to the thermal expansion, can be reduced. The damage on the bonding surface 34 due to the thermal expansion can thus be restrained.

(3) In the first exemplary embodiment, the pressure of the target fluid can be detected by analyzing the first interference light output from the first cavity 31, because the first interference light depends mainly on the pressure of the target fluid.

(4) In the first exemplary embodiment, the sensor head 30 is provided with the second cavity 32 from which the second interference light produced by the light reflected by the third reflection surface 321 and the light reflected by the fourth reflection surface 322 is output. Further, the distance between the third reflection surface 321 and the fourth reflection surface 322 depends mainly on the temperature of the target fluid and is insusceptible to the pressure of the target fluid. The second interference light output from the second cavity 32 thus depends mainly on the temperature of the target fluid. Accordingly, the pressure obtained based on the first interference light can be temperature-compensated, improving the measurement accuracy of the pressure.

(5) In the first exemplary embodiment, the first cavity 31 of the sensor head 30 is located closer to the contact surface 33 than the second cavity 32. The first cavity 31 is thus located closer to a part of the sensor head 30 that is brought into contact with the target fluid. This increases the variation in the distance between the first reflection surface 311 and the second reflection surface 312 caused by the pressure of the target fluid, thereby enhancing the pressure detection accuracy based on the interference light from the first cavity 31.

(6) In the first exemplary embodiment, the base 10 and the sensor head 30 are directly bonded. In other words, no component for bonding the base 10 and the sensor head 30 is present between the base 10 and the sensor head 30, and thus there is no risk of damaging such a component by high temperature and/or pressure. Accordingly, the physical/chemical strength of the optical sensor 1 can be enhanced.

Second Exemplary Embodiment

Next, a second exemplary embodiment of the invention will be described below with reference to the attached drawings.

The second exemplary embodiment is different from the first exemplary embodiment in that the optical fiber member 20 is connected with the sensor head 30 via a ferrule 40A and an end of the optical fiber member 20 is not in contact with the sensor head 30. It should be noted that components in the second exemplary embodiment that are the same or similar to those in the first exemplary embodiment are demoted by the same reference numerals to omit detailed description thereof.

Figure 4:
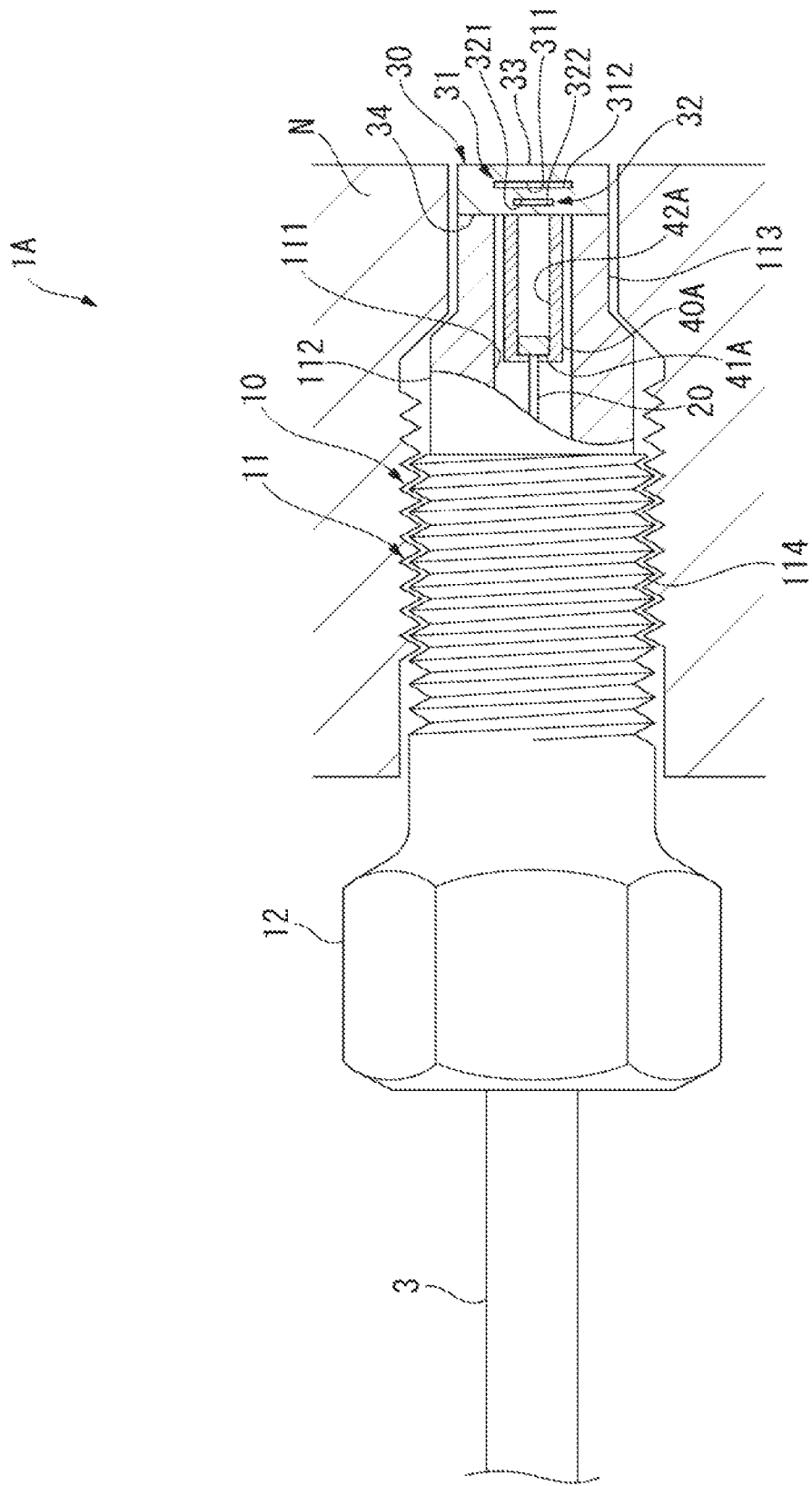
FIG. 4 is a partially-cutaway cross sectional view of an optical sensor according to a second exemplary embodiment.

FIG. 4 is a partially-cutaway cross sectional view of an optical sensor 1A according to the second exemplary embodiment.

As shown in FIG. 4, the ferrule 40A has a first end connected to the optical fiber member 20 and a second end in contact with the sensor head 30. In other words, the optical fiber member 20 is not in direct contact with the sensor head 30 but is connected with the sensor head 30 via the ferrule 40A.

In the present exemplary embodiment, the light output from the optical fiber member 20 is incident on the sensor head 30 through a collimator 41A and a hole 42A provided for the ferrule 40A. Further, the first interference light and the second interference light output from the sensor head 30 are incident on the optical fiber member 20 through the collimator 41A and the hole 42A.

It should be noted that, when the end of the optical fiber member 20 is disposed close to an end surface (i.e. the bonding surface 34) of the sensor head 30, the collimator 41A may not be provided. In this case, in order to inhibit interference between the end of the optical fiber member 20 and the end surface of the sensor head 30, the end of the optical fiber member 20 may be polished obliquely or spherically.

The following advantage can be achieved by the above-described second exemplary embodiment.

(7) In the second exemplary embodiment, the optical fiber member 20 is connected with the sensor head 30 via the ferrule 40A, where the end of the optical fiber member 20 is not in contact with the sensor head 30. The heat of the target fluid can thus be inhibited from being transferred to the optical fiber member 20. Accordingly, the damage on the optical fiber member 20 due to the heat of the target fluid can be inhibited, thereby enhancing the physical strength of the optical sensor 1A.

Third Exemplary Embodiment

Next, a third exemplary embodiment of the invention will be described below with reference to the attached drawings.

The third exemplary embodiment is different from the first exemplary embodiment in that the optical fiber member 20 is connected with the sensor head 30 via a ferrule 40B and an end of the optical fiber member 20 is not in contact with the sensor head 30. The third exemplary embodiment is also different from the first exemplary embodiment in that the ferrule 40B has no through hole. It should be noted that components in the third exemplary embodiment that are the same or similar to those in the first exemplary embodiment are demoted by the same reference numerals to omit detailed description thereof.

Figure 5:
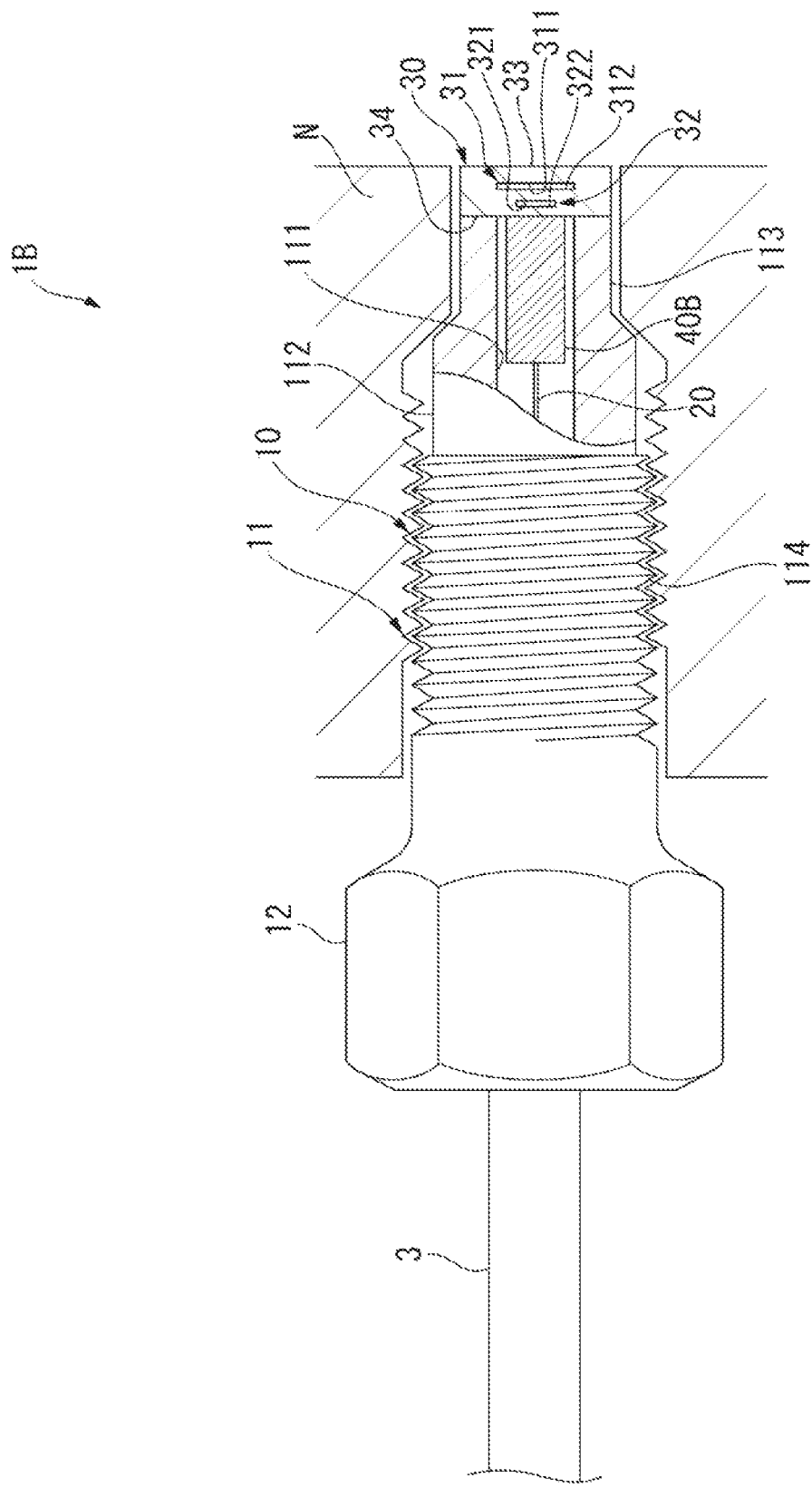
FIG. 5 is a partially-cutaway cross sectional view of an optical sensor according to a third exemplary embodiment.

FIG. 5 is a partially-cutaway cross sectional view of an optical sensor 1B according to the third exemplary embodiment.

As shown in FIG. 5, the ferrule 40B has a first end connected to the optical fiber member 20 and a second end in contact with the sensor head 30. In other words, the optical fiber member 20 is not in direct contact with the sensor head 30 but is connected with the sensor head 30 via the ferrule 40B.

Further, the ferrule 40B of the present exemplary embodiment is formed from a light transmissive material. The light output from the optical fiber member 20 is thus incident on the sensor head 30 through the ferrule 40B. Further, the first interference light and the second interference light output from the sensor head 30 are incident on the optical fiber member 20 through the ferrule 40B. In other words, the optical fiber member 20 and the ferrule 40B of the present exemplary embodiment define an optical waveguide of the invention.

The following advantage can be achieved by the above-described third exemplary embodiment.

(8) The optical fiber member 20 of the third exemplary embodiment is connected with the sensor head 30 via the ferrule 40B and the end of the optical fiber member 20 is not in contact with the sensor head 30. Accordingly, as in the above-described second exemplary embodiment, the optical fiber member 20 is inhibited from being damaged by the heat of the target fluid, thereby further enhancing the physical strength of the optical sensor 1B.

Fourth Exemplary Embodiment

Next, a fourth exemplary embodiment of the invention will be described below with reference to the attached drawings.

The fourth exemplary embodiment is different from the first to third exemplary embodiments in that a dielectric film 50C is provided at an end of a ferrule 40C. It should be noted that components in the fourth exemplary embodiment that are the same or similar to those in the first to third exemplary embodiments are demoted by the same reference numerals to omit detailed description thereof.

Figure 6:
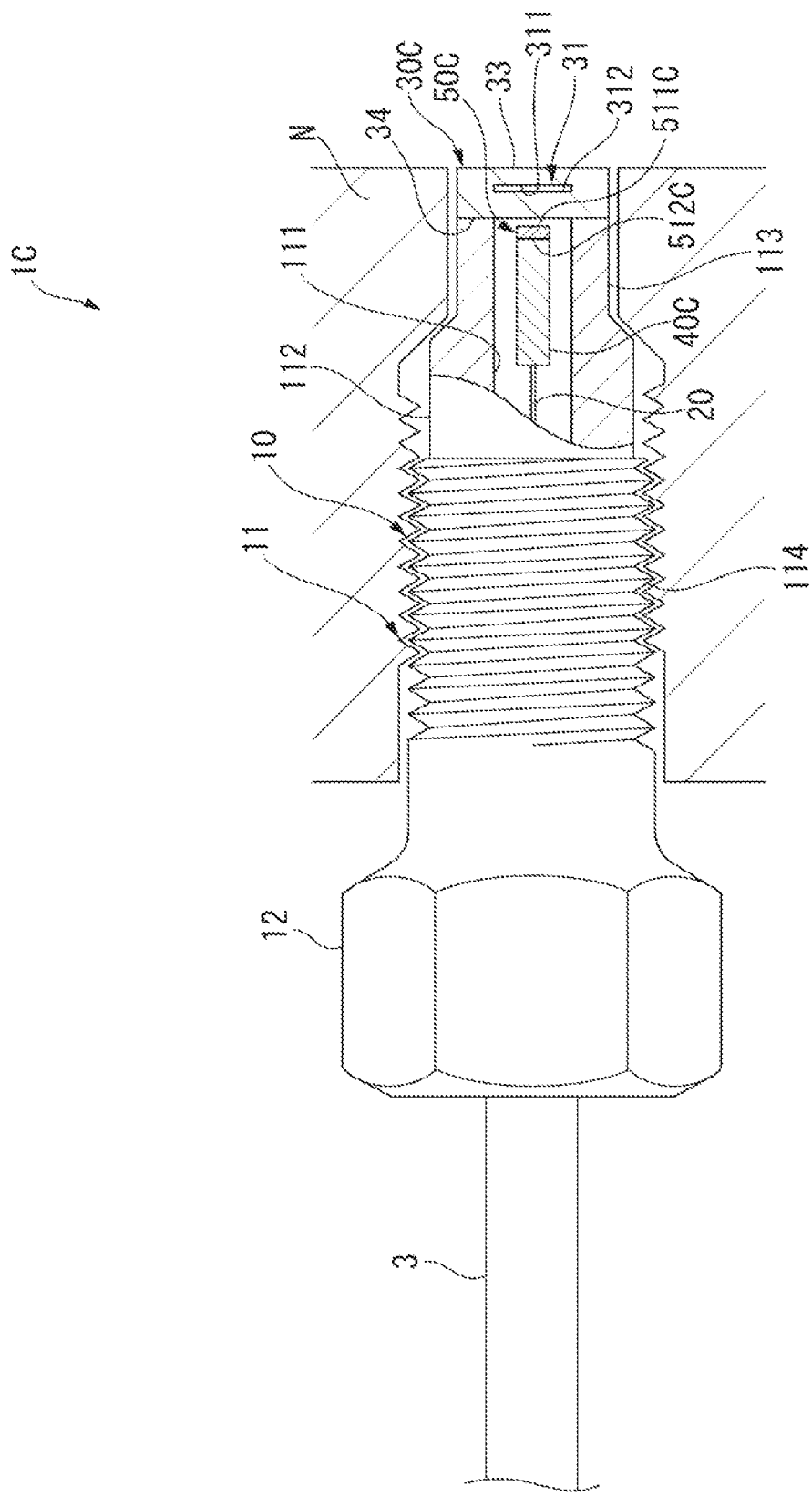
FIG. 6 is a partially-cutaway cross sectional view of an optical sensor according to a fourth exemplary embodiment.

FIG. 6 is a partially-cutaway cross sectional view of an optical sensor 1C according to the fourth exemplary embodiment.

As shown in FIG. 6, the ferrule 40C has a first end connected to the optical fiber member 20 and a second end provided with the dielectric film 50C. Further, as in the above-described third exemplary embodiment, the ferrule 40C is formed from a light transmissive material. The light introduced through the optical fiber member 20 in the present exemplary embodiment is thus incident on the sensor head 30C through the ferrule 40C and the dielectric film 50C.

It should be noted that there is a small space between the dielectric film 50C and the bonding surface 34 of the sensor head 30C. The light output from the dielectric film 50C is thus incident on the sensor head 30C through the space. Further, the sensor head 30C of the present exemplary embodiment is not provided with the second cavity 32 as described in the first to third exemplary embodiments.

Dielectric Film 50C

The dielectric film 50C is in a form of a single-layered dielectric film. The dielectric film 50C has a fifth reflection surface 511C and a sixth reflection surface 512C.

The fifth reflection surface 511C reflects a part of the light incident thereon through the optical fiber member 20 and the ferrule 40C. The sixth reflection surface 512C reflects a part of the light incident thereon through the optical fiber member 20. The light reflected by the fifth reflection surface 511C and the light reflected by the sixth reflection surface 512C interfere with each other to produce a third interference light output from the dielectric film 50C. It should be noted that the dielectric film 50C may be configured to multiply-reflect the light by the fifth reflection surface 511C and the sixth reflection surface 512C and to cause mutual interference between the multiply-reflected light beams.

It should also be noted that the dielectric film 50C is not necessarily configured as described above but is optionally in a form of, for instance, a multi-layered film provided by laminating a plurality of dielectric layers.

As described above, since there is the space between the dielectric film 50C and the sensor head 30C, the pressure of the target fluid is not transmitted to the dielectric film 50C. Accordingly, the distance between the fifth reflection surface 511C and the sixth reflection surface 512C does not vary depending on the pressure of the target fluid. In contrast, the thickness of the dielectric film 50C depends on the temperature of the target fluid. In other words, the distance between the fifth reflection surface 511C and the sixth reflection surface 512C depends on the temperature of the target fluid. Thus, the distance between the fifth reflection surface 511C and the sixth reflection surface 512C in the dielectric film 50C depends mainly on the temperature of the target fluid. In other words, the dielectric film 50C serves as a temperature-measurement optical element.

The following advantage can be achieved by the above-described fourth exemplary embodiment.

(9) The dielectric film 50C of the present exemplary embodiment includes the fifth reflection surface 511C for reflecting a part of the light introduced through the optical fiber member 20 and the sixth reflection surface 512C facing the fifth reflection surface 511C and configured to reflect a part of the light incident thereon through the optical fiber member 20. The distance between the fifth reflection surface 511C and the sixth reflection surface 512C depends mainly on the temperature of the target fluid.

The third interference light output from the dielectric film 50C thus depends on the temperature of the target fluid. The pressure obtained based on the first interference light can thus be temperature-compensated by analyzing the third interference light, thereby improving the measurement accuracy of the pressure.

Further, since the temperature compensation can be applied to the sensor head 30C provided with no temperature-measurement cavity, the sensor head 30C can be more easily produced by machining.

Fifth Exemplary Embodiment

Next, a fifth exemplary embodiment of the invention will be described below with reference to the attached drawings.

The fifth exemplary embodiment is different from the first to third exemplary embodiments in that only a single cavity is provided in the sensor head 30D. It should be noted that components in the fifth exemplary embodiment that are the same or similar to those in the first to fourth exemplary embodiments are demoted by the same reference numerals to omit detailed description thereof.

Figure 7:
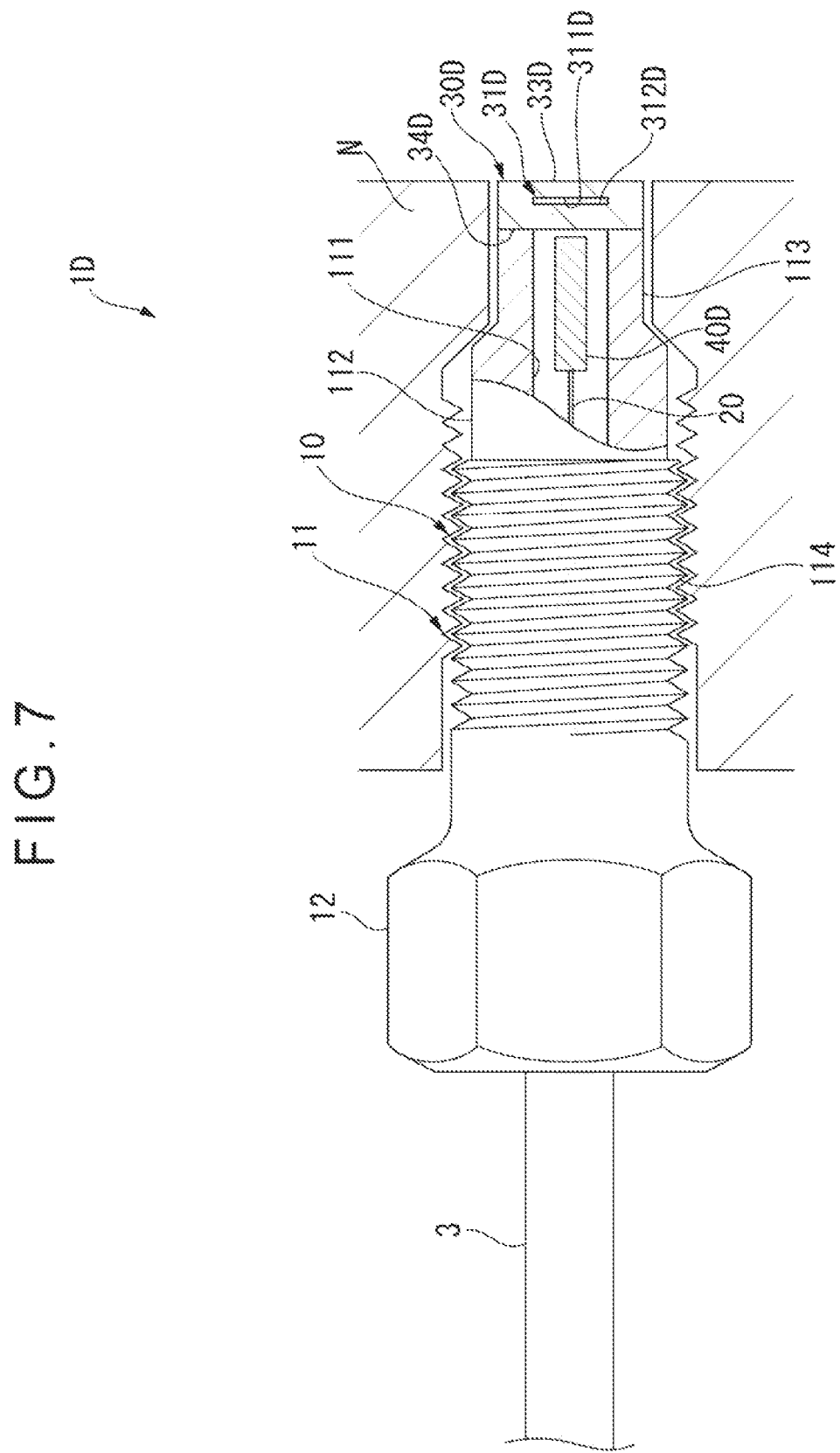
FIG. 7 is a partially-cutaway cross sectional view of an optical sensor according to a fifth exemplary embodiment.

FIG. 7 is a partially-cutaway cross sectional view of an optical sensor 1D according to the fifth exemplary embodiment.

As shown in FIG. 7, the sensor head 30D of the present exemplary embodiment is only provided with a first cavity 31D as in the above-described fourth exemplary embodiment, and is not provided with the second cavity 32 as described in the first to third exemplary embodiments.

The first reflection surface 311D and the second reflection surface 312D of the first cavity 31D are parallel to the bonding surface 34D in the present exemplary embodiment.

It should be noted that the ferrule 40D of the present exemplary embodiment is formed from a light transmissive material and a small space is provided between the ferrule 40D and the bonding surface 34D of the sensor head 30D. Accordingly, the light emitted from the ferrule 40D is incident on the sensor head 30D through the space.

The second reflection surface 312D of the present exemplary embodiment reflects a part of the light incident thereon through the optical fiber member 20 and the ferrule 40D. Further, the bonding surface 34D reflects a part of the light incident thereon through the optical fiber member 20. The light reflected by the second reflection surface 312D and the light reflected by the bonding surface 34D interfere with each other to produce a fourth interference light output from the sensor head 30D. In other words, the bonding surface 34D is an exemplary end surface of the invention. It should be noted that the light may be multiply-reflected by the second reflection surface 312D and the bonding surface 34D to cause interference between the multiply-reflected light beams.

The first reflection surface 311D and the second reflection surface 312D each reflect a part of the light incident thereon through the optical fiber member 20 as in the first reflection surface 311 and the second reflection surface 312 in the above-described first exemplary embodiment. The light reflected by the first reflection surface 311D and the light reflected by the second reflection surface 312D interfere with each other to produce the first interference light output from the first cavity 31D.

Further, since the bonding surface 34D is located closer to the base 10 than the first cavity 31D, the distance between the second reflection surface 312D and the bonding surface 34D is insusceptible to the pressure of the target fluid. In other words, the fourth interference light is not likely to be affected by the pressure of the target fluid. Accordingly, the distance between the second reflection surface 312D and the bonding surface 34D depends mainly on the temperature of the target fluid.

The following advantage can be achieved by the above-described fifth exemplary embodiment.

(10) In the fifth exemplary embodiment, the sensor head 30D has the bonding surface 34D parallel to the first reflection surface 311D and the second reflection surface 312D and configured to reflect a part of the light introduced through the optical fiber member 20, and is configured to output, to the optical fiber member 20, the fourth interference light produced by the interference between the light reflected by the second reflection surface 312D and the light reflected by the bonding surface 34D. The distance between the second reflection surface 312D and the bonding surface 34D depends on the temperature of the target fluid.

The fourth interference light output from the sensor head 30D thus depends on the temperature of the target fluid. Accordingly, the pressure obtained based on the first interference light can be temperature-compensated by analyzing the fourth interference light, thereby improving the measurement accuracy of the pressure.

Further, since the temperature compensation can be applied to the sensor head 30D provided with no temperature-measurement cavity, the sensor head head 30D can be more easily produced by machining.

Modifications

It should be noted that the present invention is not limited to the above-described embodiments but includes modifications, improvements, and the like as long as an object of the invention can be achieved.

Figure 8:
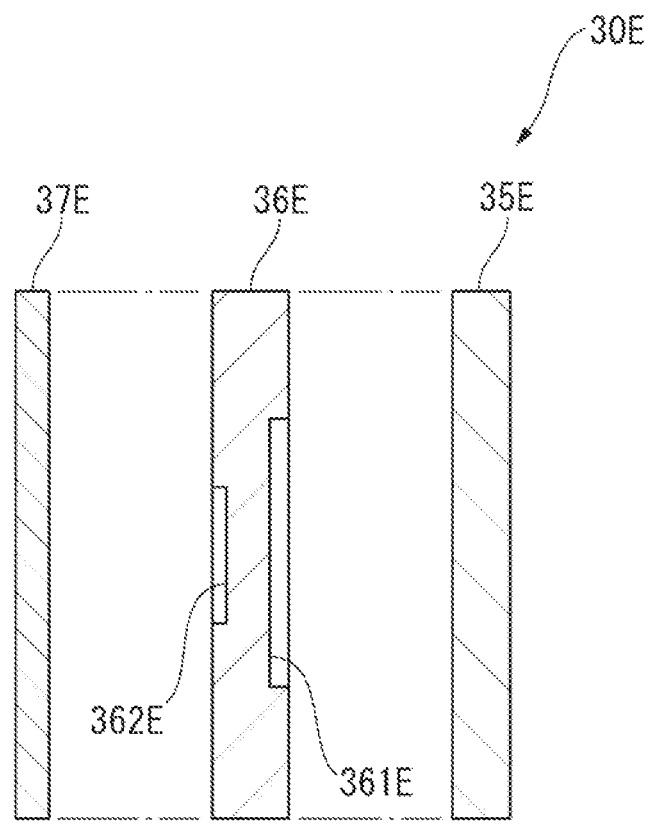
FIG. 8 is an exploded cross-sectional view of a sensor head according to a modification.

FIG. 8 is an exploded cross-sectional view of a sensor head 30E according to a modification.

As shown in FIG. 8, the sensor head 30E includes a first sensor head portion 35E, a second sensor head portion 36E, and a third sensor head portion 37E.

The second sensor head portion 36E has a first recess 361E provided close to the first sensor head portion 35E and a second recess 362E provided close to the third sensor head portion 37E. The sensor head 30E is provided by fusion bonding of the first sensor head portion 35E, the second sensor head portion 36E, and the third sensor head portion 37E in a vacuum environment. Specifically, the first recess 361E may define the first cavity 31, and the second recess 362E may define the second cavity 32.

It should be noted that the first sensor head portion 35E, the second sensor head portion 36E, and the third sensor head portion 37E are not necessarily formed by the fusion bonding but are optionally bonded by, for instance, ADB or SAB.

The base 10 is formed from titanium in the above exemplary embodiments, but not limited thereto. For instance, the base 10 may be formed from a metal whose linear expansion coefficient is close to the linear expansion coefficient of sapphire (e.g. nickel alloy (linear expansion coefficient: 5.0 to $7.0 \times 10^{-6}$/degrees C.) and titanium alloy (linear expansion coefficient: 8.0 to $9.0 \times 10^{-6}$/degrees C.)). The base 10 formed from a metal such as SUS is also encompassed by the scope of the invention.

The base 10 and the sensor head 30 are directly bonded in the above-described exemplary embodiments, but not limited thereto.

FIG. 9 is a partially-cutaway cross sectional view of an optical sensor 1F according to another modification.

As shown in FIG. 9, the base 10 and the sensor head 30 may be bonded via a bonding member 60F formed from a material such as metal, glass, and ceramics. In this case, the bonding member 60F for bonding the base 10 and the sensor head 30 is interposed between the base 10 and the sensor head 30. Due to the difference between the linear expansion coefficient of the base 10 and the linear expansion coefficient of the sensor head 30, a thermal stress, which is possibly applied to a bonding portion between the base 10 and the sensor head 30, can be released by the bonding member 60F. The damage on the bonding portion between the base 10 and the sensor head 30 caused by the thermal stress can thus be restrained.

The first cavity 31 and the second cavity 32 are concentrically arranged in a plan view seen from the contact surface 33 in the first to third exemplary embodiments, but not limited thereto. For instance, the center of the first cavity 31 and the center of the second cavity 32 may be offset.

Further, the second cavity 32 may be provided with a support portion for restraining the member between the first cavity 31 and the second cavity 32 from being bent in order to reduce an effect of the pressure of the target fluid.

Further, the scope of the invention also encompasses an arrangement in which the second cavity 32 is not provided.

The optical waveguide is provided by the optical fiber member 20 in the first and second exemplary embodiments, but not limited thereto. For instance, the optical waveguide may be provided by a light transmissive component formed from a crystalline material.

The sensor head 30 is cylindrical in the above-described exemplary embodiments, but not limited thereto. For instance, the sensor head 30 may be prismatic in shape (e.g. quadrangular prism and hexagonal prism). In this case, a receiver recess for receiving the prismatic sensor head 30 may be formed in an end of the small-diameter portion 113 of the base 10.

The temperature compensation is applied on the pressure obtained based on the first interference light by measuring the temperature based on the second interference light output from the second cavity 32 in the first to third exemplary embodiments, but not limited thereto. For instance, a temperature detector (e.g. a thermocouple and a resistance temperature detector) for measuring the temperature of the target fluid may be provided and the pressure may be temperature-compensated based on an output value of the temperature detector. In other words, the temperature may be measurable through an optical or electrical means.

The sensor head 30D is configured to produce the fourth interference light by the interference between the light reflected by the second reflection surface 312D and the light reflected by the bonding surface 34D in the fifth exemplary embodiment, but not limited thereto. For instance, the fourth interference light may be output from the sensor head by an interference between the light reflected by the first reflection surface and the light reflected by the contact surface.

The invention claimed is:

1. An optical sensor comprising:
   a tube-shaped base formed from a metal and provided therein with a through hole;
   an optical waveguide received inside the through hole of the base, the optical waveguide being an optical fiber member; and
   a sensor head bonded to the base via a bonding member to be optically connected with the optical waveguide, the sensor head being formed from monocrystalline alumina, wherein
   the sensor head comprises a first cavity comprising: a first reflection surface configured to reflect a part of light introduced through the optical waveguide; and a second reflection surface provided facing the first reflection surface and configured to reflect a part of the light introduced through the optical waveguide, the first cavity being a cavity from which a first interference light produced by an interference between the light reflected by the first reflection surface and the light reflected by the second reflection surface is output to the optical waveguide, and
   the base is formed from one of titanium, nickel alloy, titanium alloy, and steel use stainless (SUS).

2. The optical sensor according to claim 1, wherein the base is formed from a metal whose linear expansion coefficient is close to a linear expansion coefficient of the monocrystalline alumina.

3. The optical sensor according to claim 1, wherein a distance between the first reflection surface and the second reflection surface depends on a pressure of a target fluid.

4. The optical sensor according to claim 3, wherein
   the sensor head comprises a second cavity comprising: a third reflection surface configured to reflect a part of the light introduced through the optical waveguide; and a fourth reflection surface provided facing the third reflection surface and configured to reflect a part of the light introduced through the optical waveguide, the second cavity being a cavity from which a second interference light produced by an interference between the light reflected by the third reflection surface and the light reflected by the fourth reflection surface is output to the optical waveguide, and
   a distance between the third reflection surface and the fourth reflection surface depends on a temperature of the target fluid.

5. The optical sensor according to claim 4, wherein
   the sensor head comprises a contact surface located at an end of the sensor head to come into contact with the target fluid, and the first cavity is located closer to the contact surface than the second cavity in the sensor head.

6. The optical sensor according to claim 3, further comprising:
a dielectric film interposed between the optical waveguide and the sensor head to be optically connected with the optical waveguide, wherein
the dielectric film comprises: a fifth reflection surface configured to reflect a part of the light introduced through the optical waveguide; and a sixth reflection surface provided facing the fifth reflection surface and configured to reflect a part of the light introduced through the optical waveguide, the dielectric film being a film from which a third interference light produced by an interference between the light reflected by the fifth reflection surface and the light reflected by the sixth reflection surface is output to the optical waveguide, and
a distance between the fifth reflection surface and the sixth reflection surface depends on a temperature of the target fluid.

7. The optical sensor according to claim 3, wherein
the sensor head comprises an end surface parallel to the first reflection surface and the second reflection surface and configured to reflect a part of the light introduced through the optical waveguide, the sensor head being configured to output a fourth interference light to the optical waveguide, the fourth interference light being produced by an interference between the light reflected by the first reflection surface or the second reflection surface and the light reflected by the end surface, and
a distance between the first reflection surface or the second reflection surface and the end surface depends on a temperature of the target fluid.

8. An optical sensor comprising:
a tube-shaped base formed from a metal and provided therein with a through hole;
an optical waveguide received inside the through hole of the base, the optical waveguide being an optical fiber member; and
a sensor head directly bonded to the base to be optically connected with the optical waveguide, the sensor head being formed from monocrystalline alumina, wherein
the sensor head comprises a first cavity comprising: a first reflection surface configured to reflect a part of light introduced through the optical waveguide; and a second reflection surface provided facing the first reflection surface and configured to reflect a part of the light introduced through the optical waveguide, the first cavity being a cavity from which a first interference light produced by an interference between the light reflected by the first reflection surface and the light reflected by the second reflection surface is output to the optical waveguide, and
the base is formed from one of titanium, nickel alloy, titanium alloy, and SUS.

9. A physical quantity measuring device comprising:
a light source;
an optical sensor comprising a tube-shaped base formed from a metal and provided therein with a through hole, an optical waveguide optically connected with the light source and received inside the through hole of the base, the optical waveguide being in an optical fiber member and a sensor head bonded via a bonding member to an end of the base to be optically connected with the optical waveguide, the sensor head being formed from monocrystalline alumina;
a light detector; and
an arithmetic unit configured to be a processor, wherein
the sensor head comprises a first cavity comprising: a first reflection surface configured to reflect a part of light introduced through the optical waveguide; and a second reflection surface provided facing the first reflection surface and configured to reflect a part of the light introduced through the optical waveguide, the first cavity being a cavity from which a first interference light produced by an interference between the light reflected by the first reflection surface and the light reflected by the second reflection surface is output,
the light detector is configured to detect a first interference signal based on the first interference light output from the first cavity,
the arithmetic unit is configured to calculate a physical quantity of a target fluid based on the first interference signal detected by the light detector, and
the base is formed from one of titanium, nickel alloy, titanium alloy, and steel use stainless (SUS).

* * * * *